(12) United States Patent
Choi et al.

(10) Patent No.: US 12,339,423 B2
(45) Date of Patent: Jun. 24, 2025

(54) SMALL LENS SYSTEM FOR DEVELOPING CLOSE TOLERANCE

(71) Applicant: SEKONIX CO., LTD., Gyeonggi-do (KR)

(72) Inventors: Soon Cheol Choi, Gyeonggi-do (KR); Ki Youn Noh, Gyeonggi-do (KR); Seong Jun Bae, Gyeonggi-do (KR)

(73) Assignee: SEKONIX CO., LTD., Gyeonggi-do (KR)

( * ) Notice: Subject to any disclaimer, the term of this patent is extended or adjusted under 35 U.S.C. 154(b) by 595 days.

(21) Appl. No.: 17/704,534

(22) Filed: Mar. 25, 2022

(65) Prior Publication Data

US 2022/0326489 A1 Oct. 13, 2022

(30) Foreign Application Priority Data

Mar. 30, 2021 (KR) .................. 10-2021-0040852

(51) Int. Cl.
*G02B 13/18* (2006.01)
*G02B 3/00* (2006.01)
*G02B 9/62* (2006.01)
*G02B 13/00* (2006.01)

(52) U.S. Cl.
CPC ....... *G02B 13/0045* (2013.01); *G02B 3/0043* (2013.01); *G02B 9/62* (2013.01)

(58) Field of Classification Search
CPC . G02B 9/00; G02B 9/62; G02B 13/00; G02B 13/001; G02B 13/0015; G02B 13/002; G02B 13/0045; G02B 13/008; G02B 13/14; G02B 13/143; G02B 13/146; G02B 13/18; G02B 27/0025; G02B 3/0037; G02B 3/0043
USPC ....... 359/355–357, 713, 733, 749, 752, 754, 359/756–762
See application file for complete search history.

(56) References Cited

U.S. PATENT DOCUMENTS

| | | | | |
|---|---|---|---|---|
| 9,804,364 | B2 * | 10/2017 | Sekine | G02B 27/0025 |
| 11,221,464 | B2 * | 1/2022 | Oinuma | G02B 9/62 |
| 2016/0161709 | A1 * | 6/2016 | Hsueh | G02B 9/62 |
| | | | | 359/713 |
| 2017/0322391 | A1 * | 11/2017 | Kang | G02B 13/0045 |
| 2023/0048740 | A1 * | 2/2023 | Choi | G02B 9/62 |

\* cited by examiner

*Primary Examiner* — Thong Q Nguyen
(74) *Attorney, Agent, or Firm* — Mendelsohn Dunleavy, P.C.

(57) ABSTRACT

A small lens system for developing a close tolerance is proposed. The small lens system includes a first lens, a second lens, a third lens, a fourth lens, a fifth lens, and a sixth lens that are arranged in order along an optical axis from an object. Refractive power P1 of the first lens satisfies $-0.01$ $mm^{-1}<P1<0.01\ mm^{-1}$, the second lens is shaped with opposite convex surfaces, and refractive power P2 of the second lens satisfies $P2>0.4\ mm^{-1}$, the third lens has negative refractive power, and a rear surface curvature C6 of the third lens satisfies $-0.01\ mm^{-1}<C6<0.01\ mm^{-1}$, refractive power P4 of the fourth lens satisfies $-0.1\ mm^{-1}<P4<0.1\ mm^{-1}$, refractive power P5 of the fifth lens satisfies $P5>0.7\ mm^{-1}$, and refractive power P6 of the sixth lens satisfies $P6<-0.7\ mm^{-1}$.

8 Claims, 12 Drawing Sheets

PRIOR ART

PRIOR ART

SMALL LENS SYSTEM FOR DEVELOPING CLOSE TOLERANCE

CROSS REFERENCE TO RELATED APPLICATION

The present application claims priority to Korean Patent Application No. 10-2021-0040852, filed Mar. 30, 2021, the entire contents of which is incorporated herein for all purposes by this reference.

BACKGROUND OF THE INVENTION

Field of the Invention

The present disclosure relates generally to a small lens system consisting of six lenses and, more particularly, to a small lens system for developing a close tolerance by presetting the refractive power of each lens.

Description of the Related Art

Recently, a demand for high-definition, high-performance, miniaturization and weight reduction of electronic devices with a camera function, particularly smartphones has been increased.

Therefore, research to realize the above demand is in progress by improving performance of an ultra-small lens optical system. However, the conventional ultra-small lens optical system has very high sensitivity, and thus is not suitable for high-resolution performance.

As shown in FIGS. 1 and 2, the lens optical system based on US patent Nos. U.S. Pat. No. 8,379,323 B2 and U.S. Pat. No. 8,830,595 B2 consists of six small lens systems that are arranged from an object. FIG. 1 shows aperture stop 100, first lens element 110 having object-side surface 111 and image-side surface 112, second lens element 120 having object-side surface 121 and image-side surface 122, third lens element 130 having object-side surface 131 and image-side surface 132, fourth lens element 140 having object-side surface 141 and image-side surface 142, fifth lens element 150 having object-side surface 151 and image-side surface 152, sixth lens element 160 having object-side surface 161 and image-side surface 162, IR (infrared) cut filter 180, and image plane 170. FIG. 2 shows aperture stop 100, first lens element 110 having object-side surface 111 and image-side surface 112, second lens element 120 having object-side surface 121 and image-side surface 122, third lens element 130 having object-side surface 131 and image-side surface 132, fourth lens element 140 having object-side surface 141 and image-side surface 142, fifth lens element 150 having object-side surface 151 and image-side surface 152, sixth lens element 160 having object-side surface 161 and image-side surface 162, IR-filter 170, image plane 180, and image sensor 190. A first lens has a stop and high refractive power, so there is a problem in that sensitivity thereof is high.

Furthermore, a second lens has negative refractive power and is formed close to the first lens, and thus has a structure with high sensitivity.

Furthermore, the conventional small lens system is configured such that power is largely focused on the first lens and the second lens and dependence on the power of the first lens and the second lens is high, so the sensitivity of the lens is high and the lens is sensitive to tolerance.

Specifically, when tolerance of the small lens system is sensitive, performance of each product is changed. Therefore, research to improve the product performance reproducibility in an easy method by relieving the sensitivity to the tolerance of the entire small lens system is needed.

SUMMARY OF THE INVENTION

Accordingly, the present disclosure has been made keeping in mind the above problem occurring in the related art, and the present disclosure is intended to provide a small lens system for developing a close tolerance by configuring the small lens system with six lenses and presetting refractive power and shape of each lens.

In order to achieve the above objective, according to one aspect of the present disclosure, there is provided a small lens system for developing a close tolerance, the small lens system including a first lens, a second lens, a third lens, a fourth lens, a fifth lens, and a sixth lens that may be arranged in order along an optical axis from an object, wherein refractive power P1 of the first lens may satisfy $-0.01 \text{ mm}^{-1} < P1 < 0.01 \text{ mm}^{-1}$, the second lens may be shaped with opposite convex surfaces, and refractive power P2 of the second lens may satisfy $P2 > 0.4 \text{ mm}^{-1}$, the third lens may have negative refractive power, and a rear surface curvature C6 of the third lens may satisfy $-0.01 \text{ mm}^{-1} < C6 < 0.01 \text{ mm}^{-1}$, refractive power P4 of the fourth lens may satisfy $-0.1 \text{ mm}^{-1} < P4 < 0.1 \text{ mm}^{-1}$, refractive power P5 of the fifth lens may satisfy $P5 > 0.7 \text{ mm}^{-1}$, and refractive power P6 of the sixth lens may satisfy $P6 < -0.7 \text{ mm}^{-1}$, an object-side surface of the sixth lens may have at least one inflection point and amount of sag may be increased and reduced in response to height of the sixth lens, and an image-side surface of the sixth lens may have at least one inflection point and amount of sag may be increased and reduced in response to the height thereof.

The small lens system may have a stop located at the first lens.

An absolute value $|P5|$ of the refractive power of the fifth lens and an absolute value $|P6|$ of the refractive power of the sixth lens may satisfy $-0.1 \text{ mm}^{-1} < |P5| - |P6| < 0.1 \text{ mm}^{-1}$.

A lens thickness et1 at a height of a front effective diameter and a center thickness ct1 of the first lens may satisfy $|et1 - ct1| < 0.07$ mm.

A lens thickness et4 at a height of a front effective diameter and a center thickness ct4 of the fourth lens may satisfy $|et4 - ct4| < 0.05$ mm.

A lens thickness et5 at a height of a front effective diameter and a center thickness ct5 of the fifth lens may satisfy $et5 - ct5 > 0.15$ mm.

An Abbe number V1 of the first lens, an Abbe number V2 of the second lens, an Abbe number V3 of the third lens, an Abbe number V4 of the fourth lens, an Abbe number V5 of the fifth lens, and an Abbe number V6 of the sixth lens may satisfy $50 < V1 < 60$, $50 < V2 < 60$, $15 < V3 < 30$, $15 < V4 < 30$, $50 < V5 < 60$, and $50 < V6 < 60$, respectively.

Each of the first lens to the sixth lens may have only aspherical surfaces, and the first lens to the sixth lens may be made of plastic.

The present disclosure relates to the small lens system consisting of the first lens, the second lens, the third lens, the fourth lens, the fifth lens, and the sixth lens that are arranged in order along the optical axis from an object. According to the present disclosure, the refractive power, the shape, etc. of each lens are properly designed, so that there is an effect of providing the small lens system that is small and lightweight and is less sensitive to tolerance.

Specifically, the sensitivity to a tolerance of the lens is relieved by presetting the refractive power of each lens, locating stop at the first lens, reducing the refractive power of the first lens as small as possible, and forming the second lens with opposite convex surfaces and giving the strong positive refractive power to the second lens, so that there is an effect of improving the product performance reproducibility.

Furthermore, there is an effect of providing the small lens system configured such that the fifth lens has the strong positive refractive power to reduce the length of the lens, the absolute value of the refractive power of the fifth lens and the absolute value of the refractive power of the sixth lens are similar to each other, and a distance between the lenses is reduced while the sag amount of the sixth lens is increased and reduced in response to the height thereof.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

The present disclosure relates to a lens system consisting of six lenses and, more particularly, to a lens system with a first lens, a second lens, a third lens, a fourth lens, a fifth lens, and a sixth lens that are arranged in order along an optical axis from an object.

Furthermore, chromatic aberration of the lens is corrected and the lens is small and lightweight by properly designing the refractive power, shape, etc. of the lens, and the lens may be easily applied in a small camera module, particularly, in a smartphone.

Specifically, the sensitivity to a tolerance of the lens is relieved by presetting the refractive power of each lens and locating a stop at the first lens and reducing the refractive power as small as possible, and forming the second lens with opposite convex surfaces and giving the strong positive refractive power to the second lens.

Furthermore, the small lens system is provided such that the fifth lens has the strong positive refractive power to reduce the length of the lens, the absolute value of the refractive power of the fifth lens and the absolute value of the refractive power of the sixth lens are similar to each other, a distance between the lenses is reduced while the sag amount of the sixth lens is increased and reduced in response to the height thereof.

Figure 1:
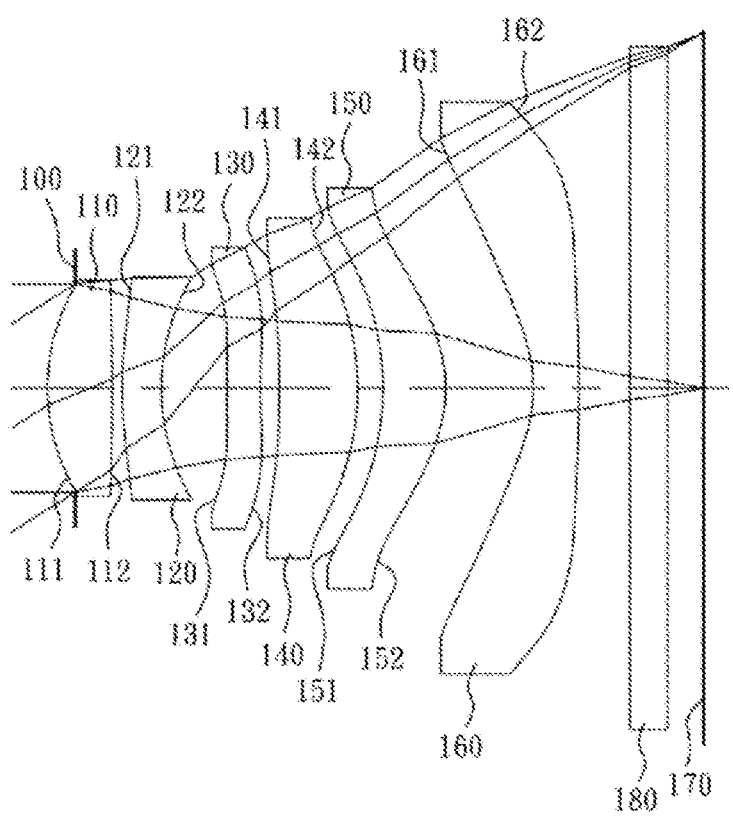
FIGS. 1 and 2 are views showing a small lens system according to the related art.
Figure 2:
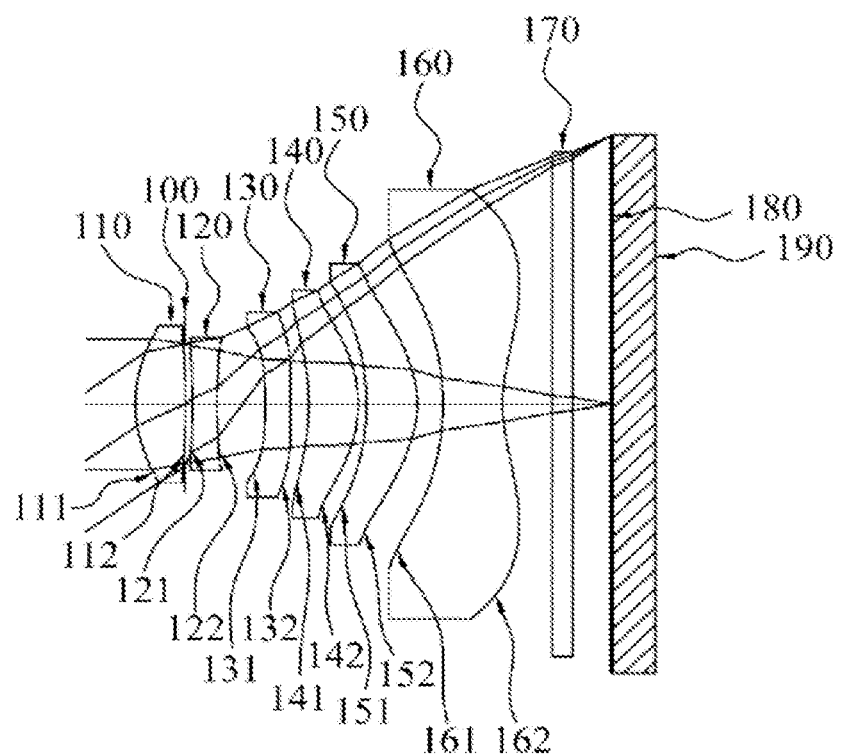
Figure 3:
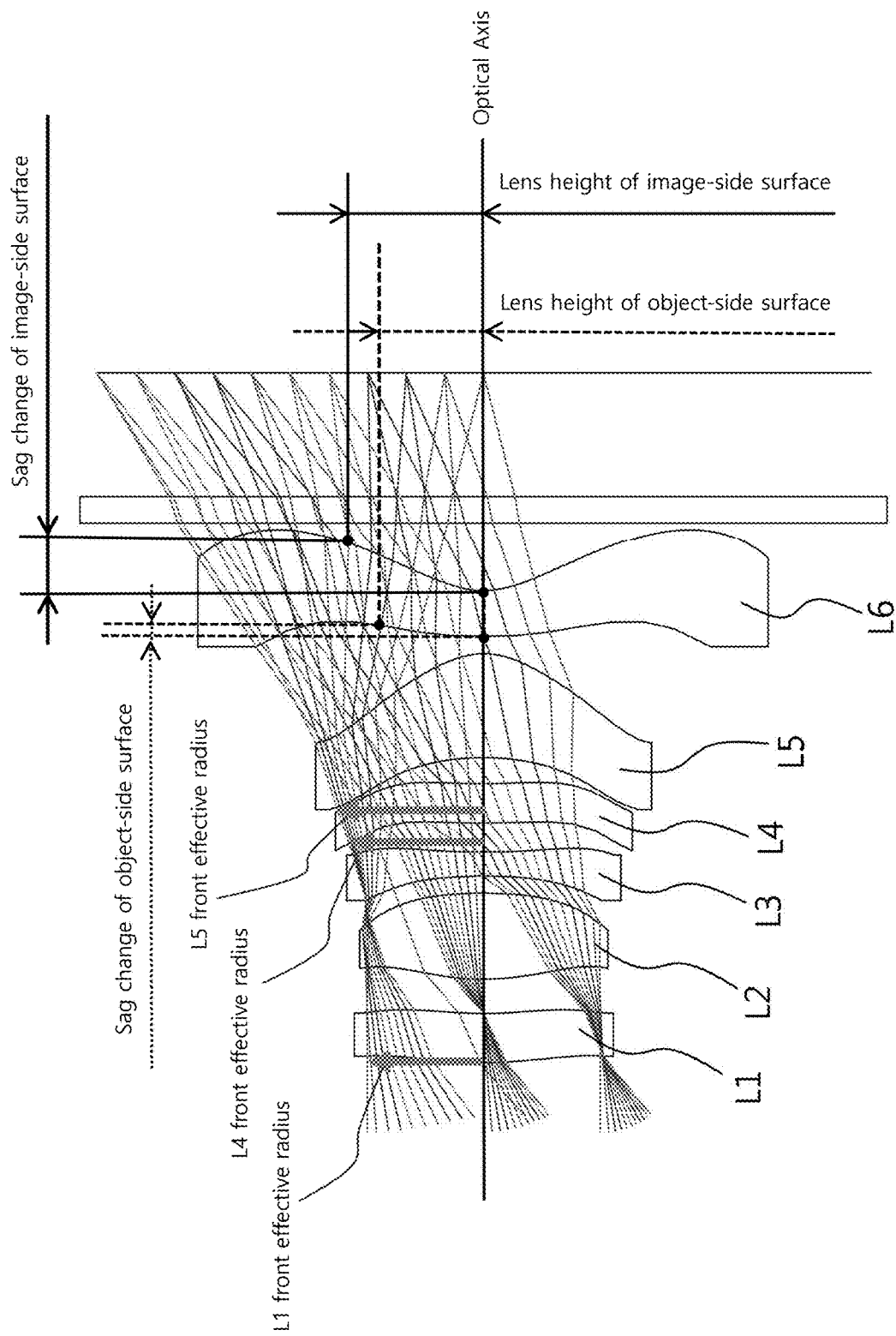
FIG. 3 is a view showing a small lens system for developing a close tolerance according to a first embodiment of the present disclosure.
Figure 4:
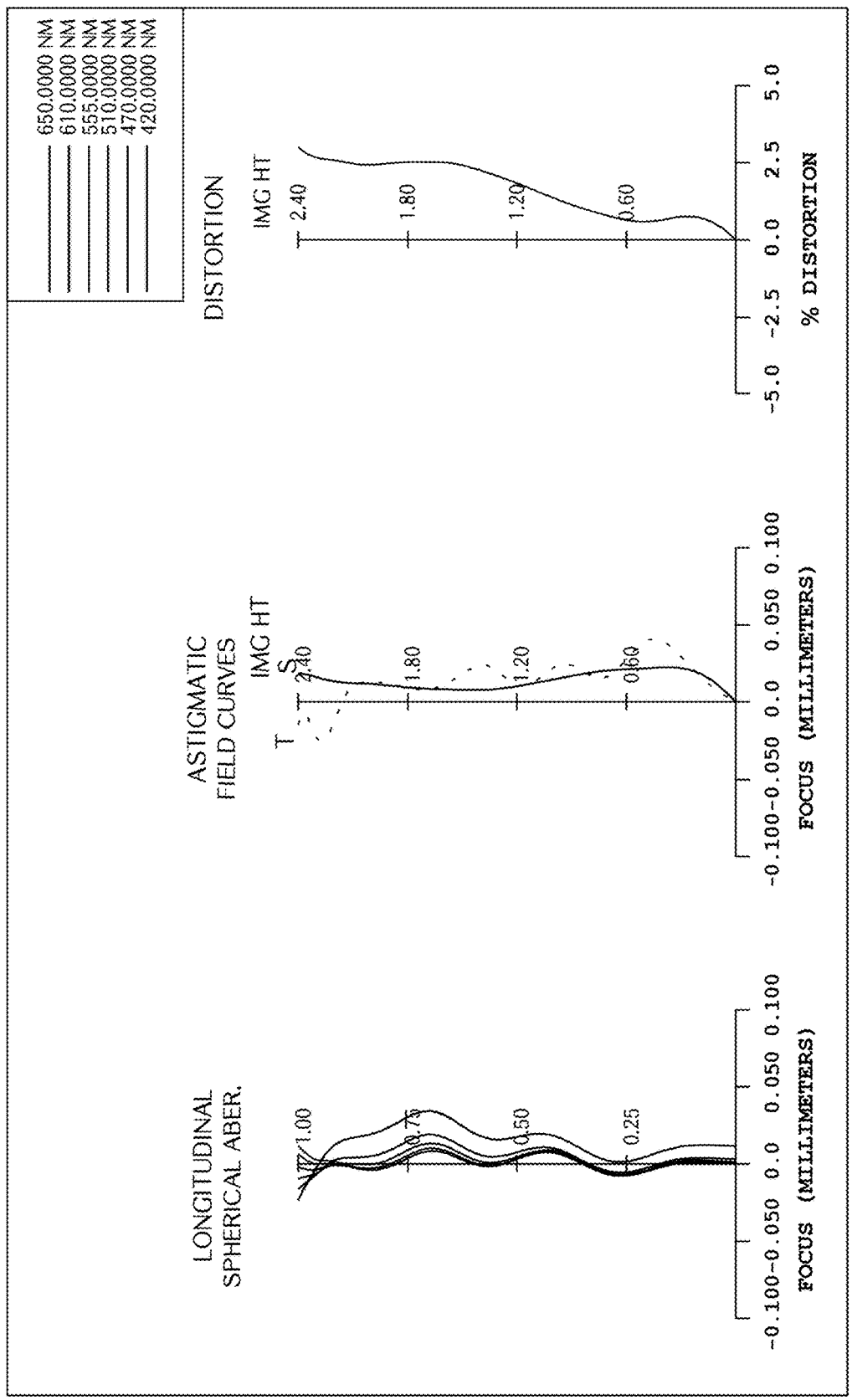
FIG. 4 is a view showing the aberration degree according to the embodiment of the present disclosure.
Figure 5:
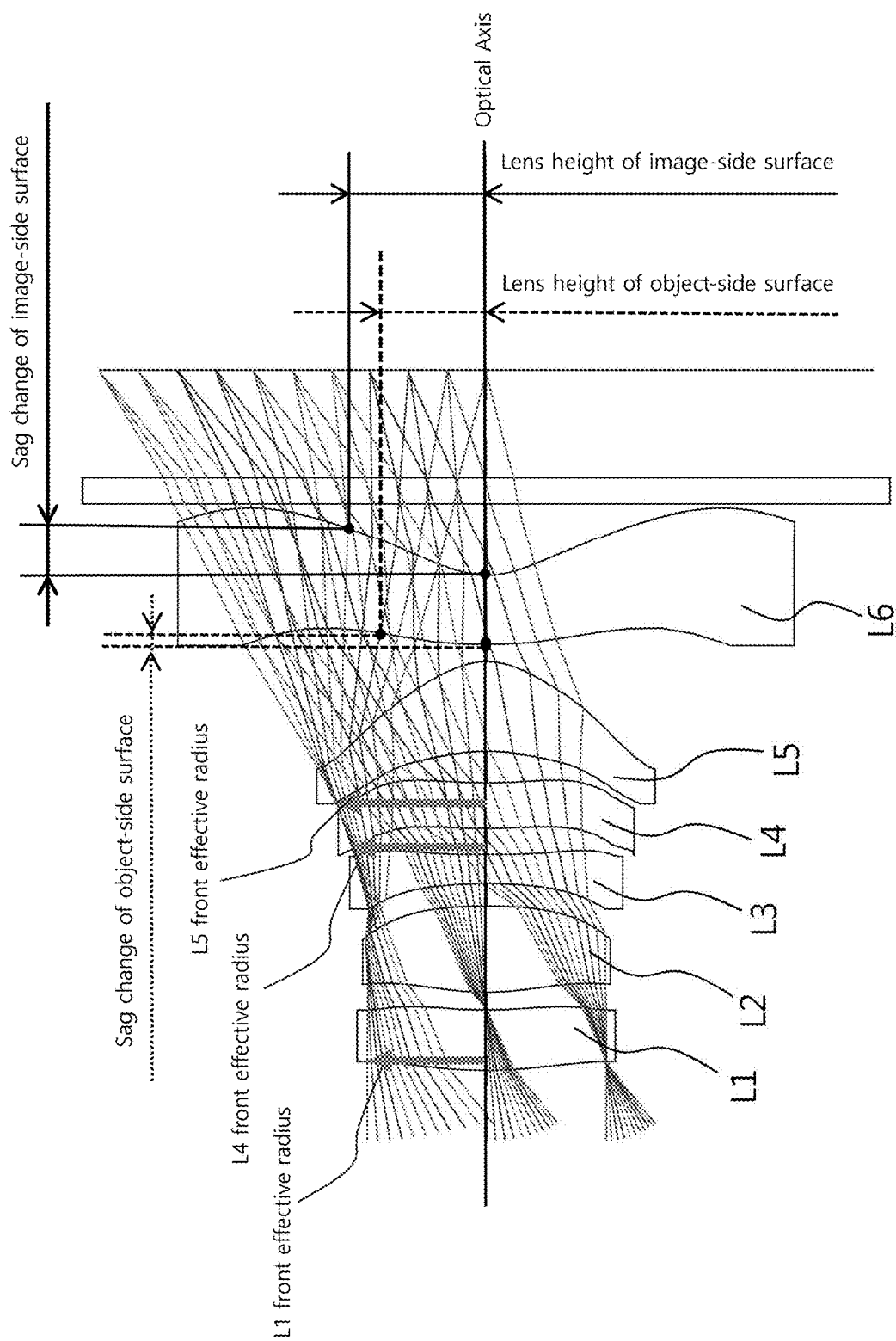
FIG. 5 is a view showing a small lens system for developing a close tolerance according to a second embodiment of the present disclosure.
Figure 6:
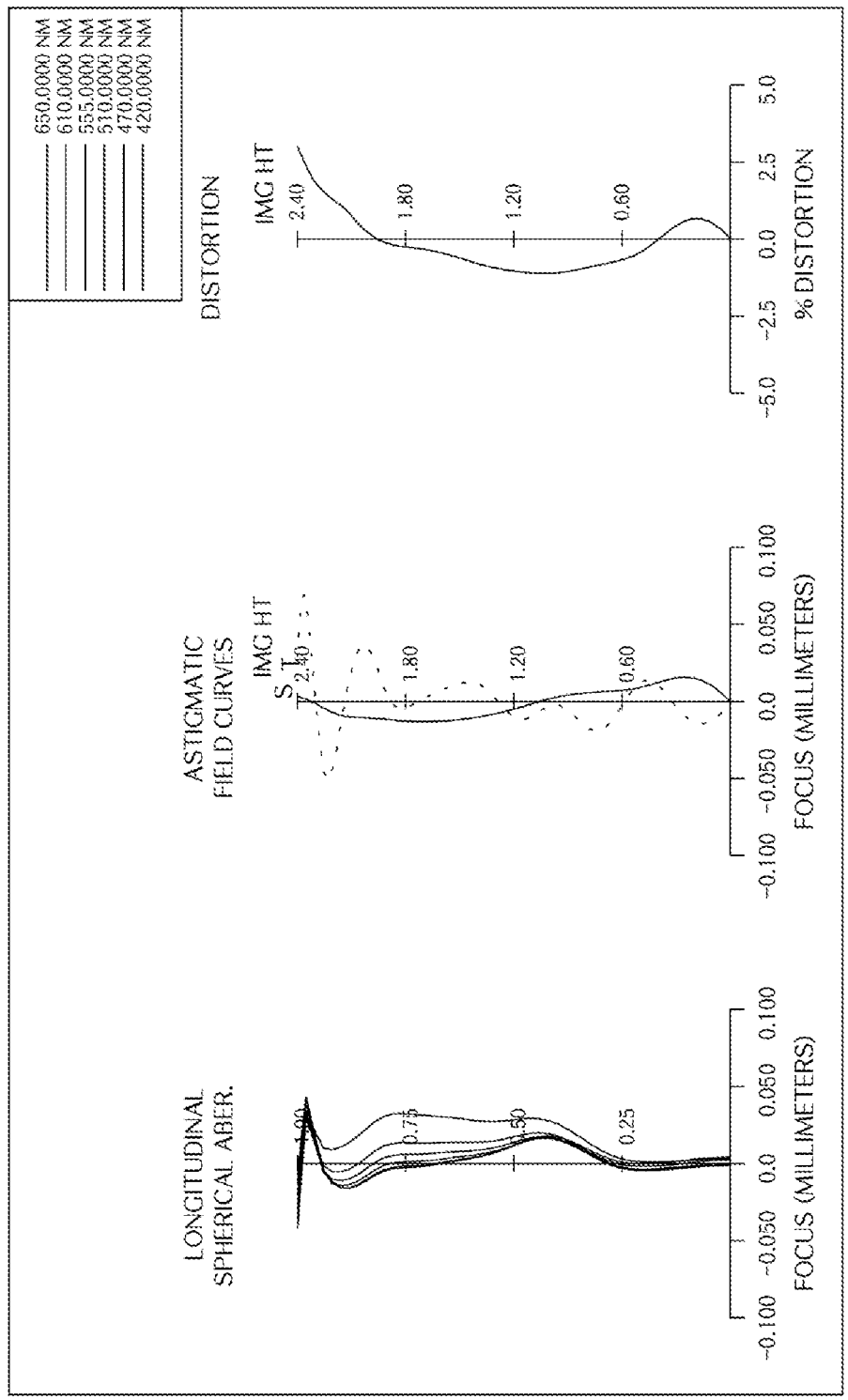
FIG. 6 is a view showing the aberration degree according to the second embodiment of the present disclosure.
Figure 7:
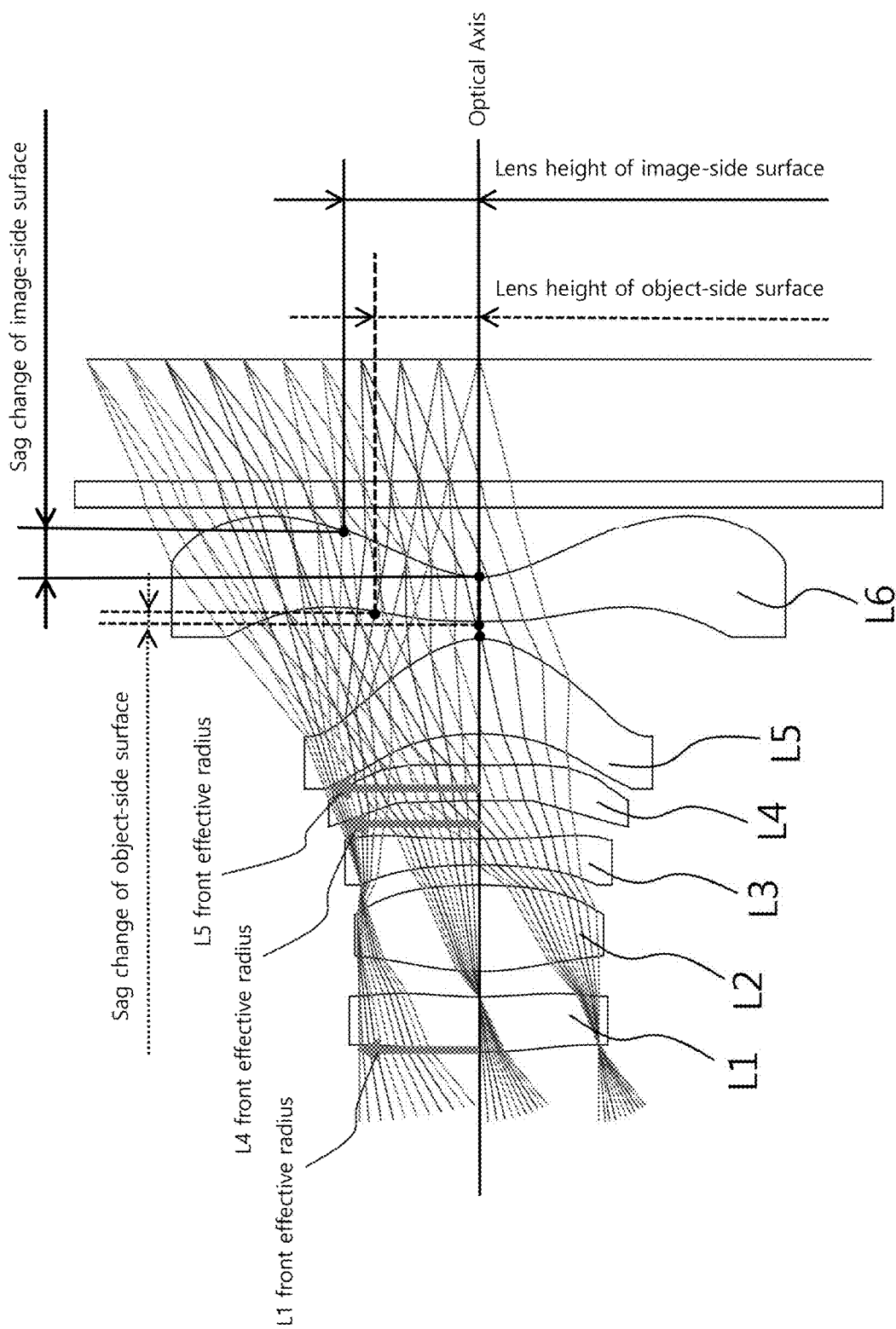
FIG. 7 is a view showing a small lens system for developing a close tolerance according to a third embodiment of the present disclosure.
Figure 8:
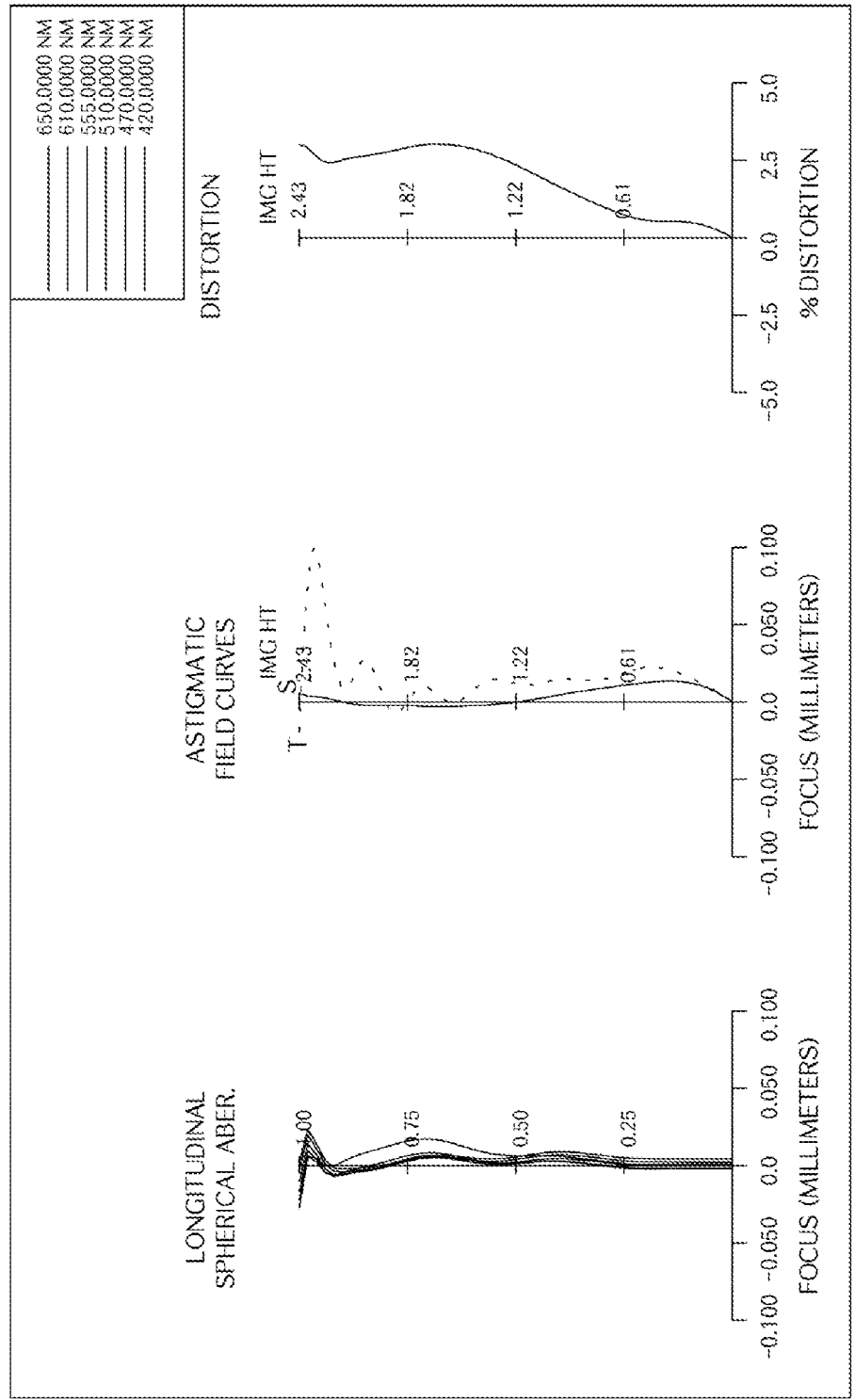
FIG. 8 is a view showing the aberration degree according to the third embodiment of the present disclosure.
Figure 9:
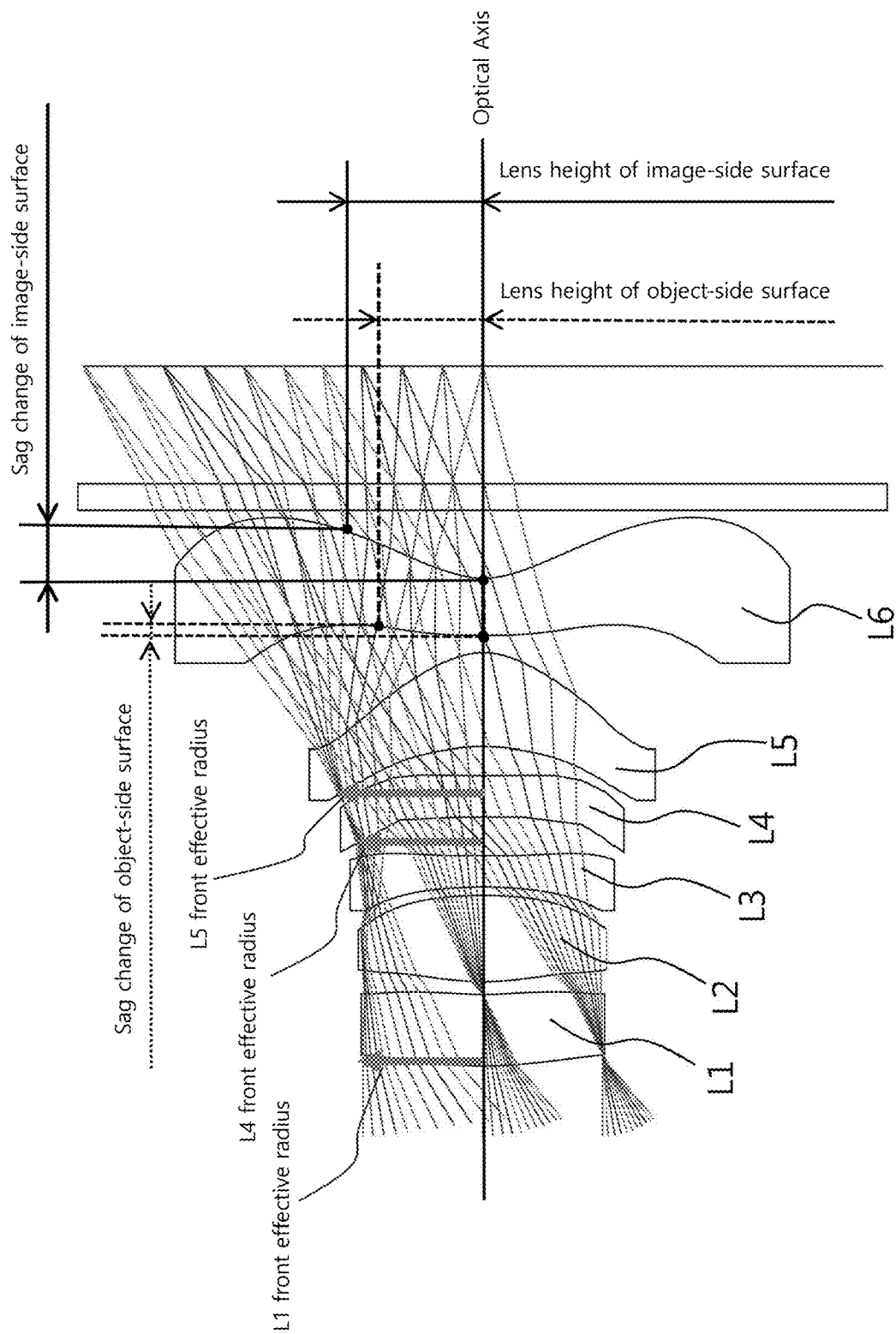
FIG. 9 is a view showing a small lens system for developing a close tolerance according to a fourth embodiment of the present disclosure.
Figure 10:
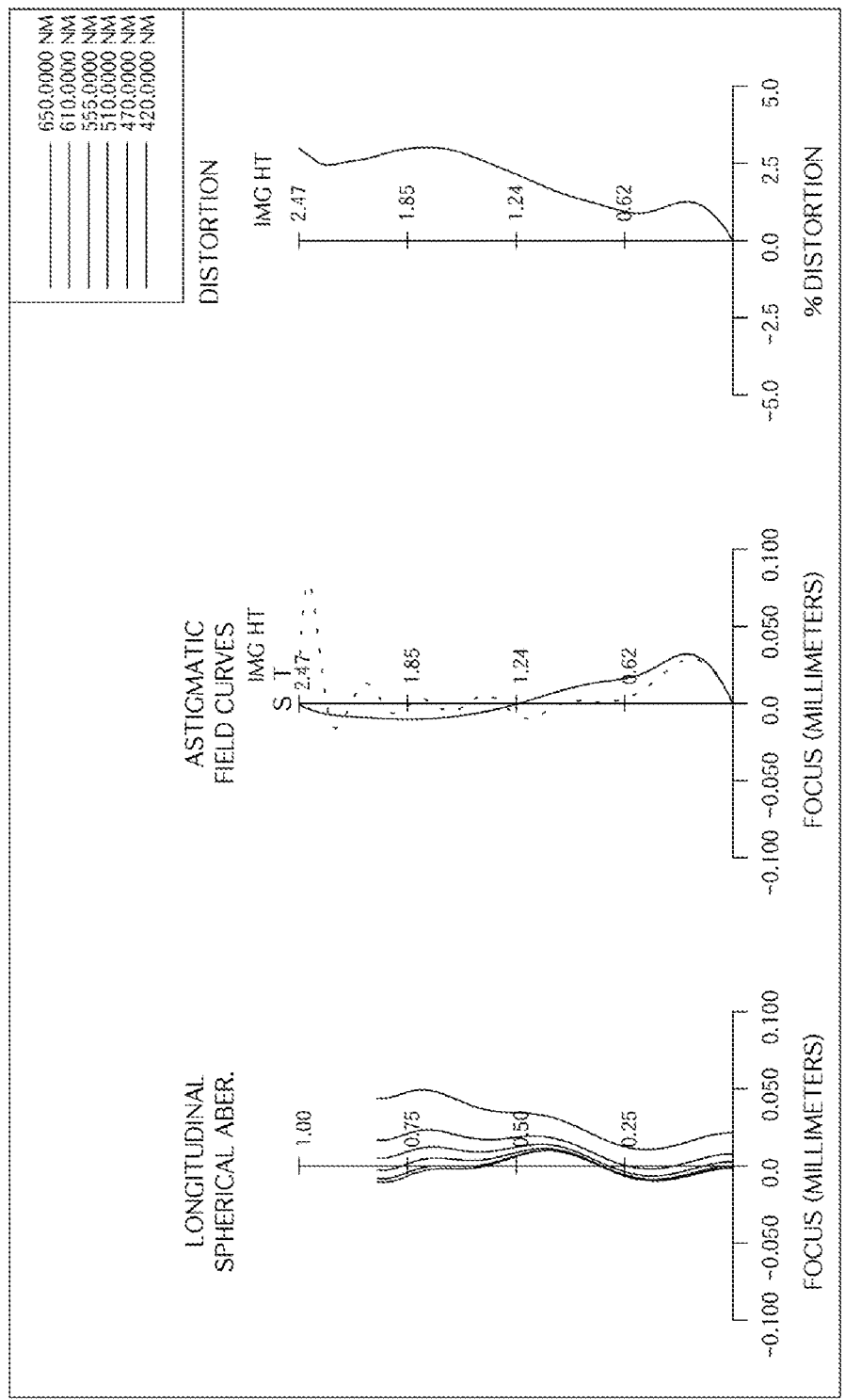
FIG. 10 is a view showing the aberration degree according to the fourth embodiment of the present disclosure.
Figure 11:
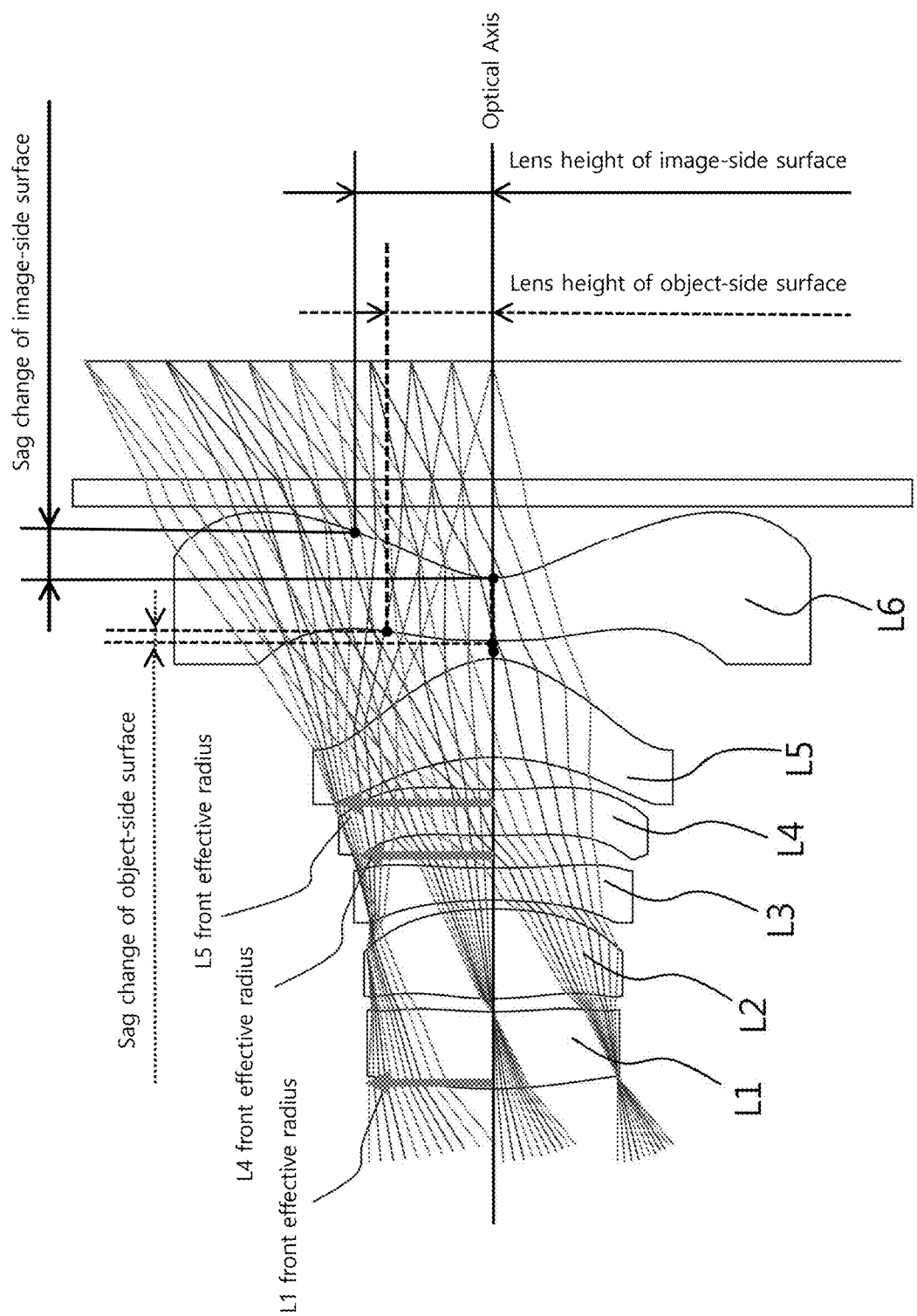
FIG. 11 is a view showing a small lens system for developing a close tolerance according to a fifth embodiment of the present disclosure.
Figure 12:
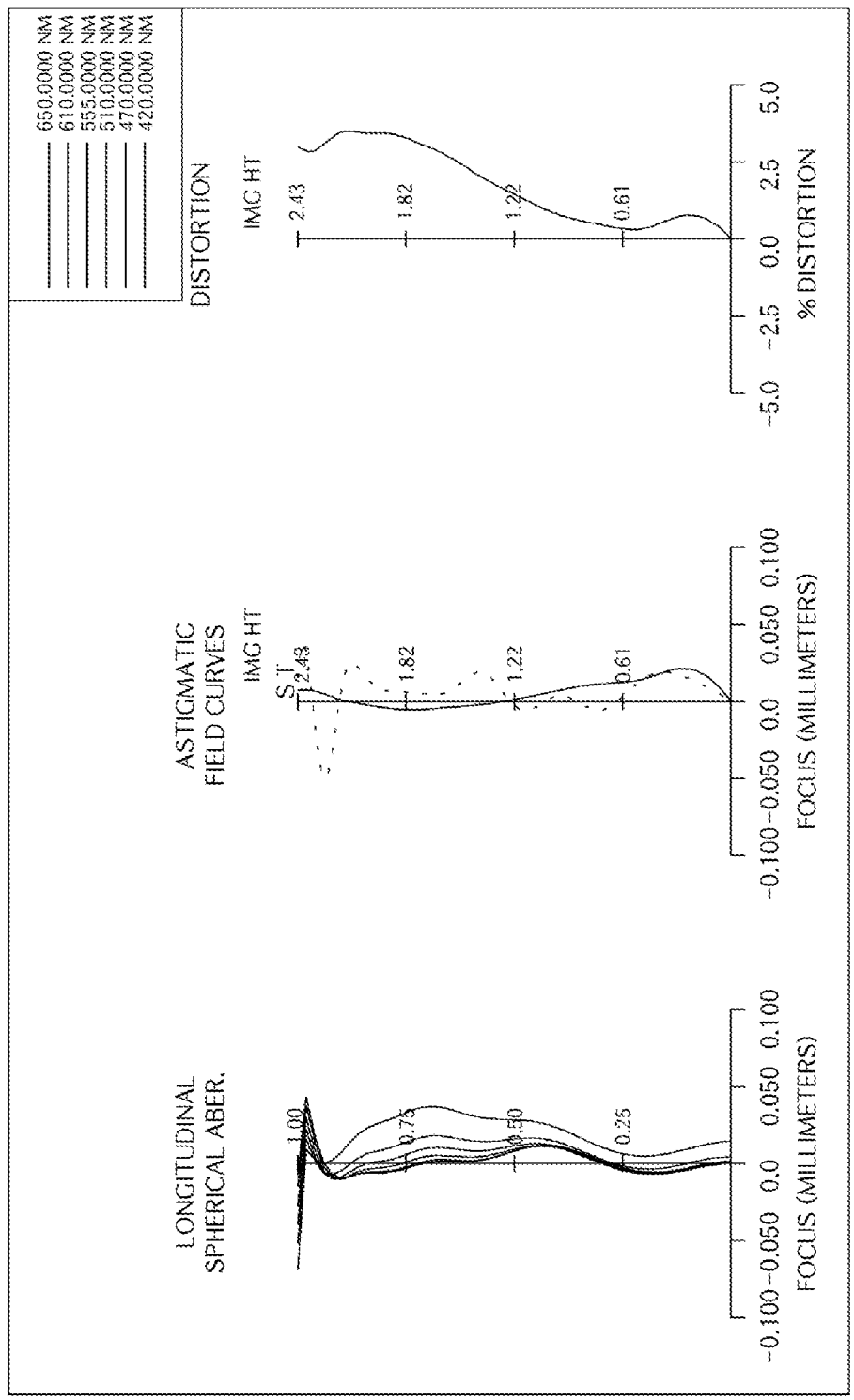
FIG. 12 is a view showing the aberration degree according to the fifth embodiment of the present disclosure.

Hereinbelow, the present disclosure will be described in detail with reference to accompanying drawings. FIG. 3 is a view showing a small lens system for developing relieved sensitivity according to a first embodiment of the present disclosure. FIG. 4 is a view showing the aberration degree according to the embodiment of the present disclosure. FIG. 5 is a view showing a small lens system for developing relieved sensitivity according to a second embodiment of the present disclosure. FIG. 6 is a view showing the aberration degree according to the second embodiment of the present disclosure. FIG. 7 is a view showing a small lens system for developing relieved sensitivity according to a third embodiment of the present disclosure. FIG. 8 is a view showing the aberration degree according to the third embodiment of the present disclosure. FIG. 9 is a view showing a small lens system for developing relieved sensitivity according to a fourth embodiment of the present disclosure. FIG. 10 is a view showing the aberration degree according to the fourth embodiment of the present disclosure. FIG. 11 is a view showing a small lens system for developing a close tolerance according to a fifth embodiment of the present disclosure. FIG. 12 is a view showing the aberration degree according to the fifth embodiment of the present disclosure.

As shown in the drawings, the small lens system of the present disclosure includes a first lens L1, a second lens L2, a third lens L3, a fourth lens L4, a fifth lens L5, and a sixth lens L6 that are arranged in order along an optical axis from an object.

Herein, refractive power P1 of the first lens L1 satisfies $-0.01$ mm$^{-1}$<P1<0.01 mm$^{-1}$. The second lens L2 is shaped with opposite convex surfaces, and refractive power P2 of the second lens L2 satisfies P2>0.4 mm$^{-1}$. The third lens L3 has negative refractive power, and a rear surface curvature C6 of the third lens L3 satisfies $-0.01$ mm$^{-1}$<C6<0.01 mm$^{-1}$. Refractive power P4 of the fourth lens L4 satisfies $-0.1$ mm$^{-1}$<P4<0.1 mm$^{-1}$. Refractive power P5 of the fifth lens L5 satisfies P5>0.7 mm$^{-1}$. Refractive power P6 of the sixth lens L6 satisfies P6<$-0.7$ mm$^{-1}$, an object-side surface of the sixth lens L6 has at least one inflection point and the sag amount is increased and reduced in response to height of the lens, and an image-side surface of the sixth lens L6 has at least one inflection point and the sag amount is increased and reduced in response to the height of the lens.

The above configuration is provided to relieve the sensitivity to a tolerance by presetting the refractive power of each lens, locating the stop at the first lens L1, reducing the refractive power of the first lens L1 as small as possible, and forming the second lens L2 with opposite convex surfaces and giving the strong positive refractive power to the second lens L2.

Furthermore, the small lens system is provided such that the fifth lens L5 has the strong positive refractive power to reduce the length of the lens, the absolute value of the refractive power of the fifth lens L5 and the absolute value of the refractive power of the sixth lens L6 are similar to each other, a distance between the lenses is reduced while the sag amount of the sixth lens L6 is increased and reduced in response to the height thereof.

As described above, as the refractive power and the shape of the small lens system are designed so that sensitivity to tolerance is reduced and negative and positive refractive power are properly distributed to each lens. Therefore, high performance suitable for the small lens system with relieved tolerance can be implemented.

In the small lens system of the present disclosure, the stop is located at the first lens L1 and the refractive power of the first lens L1 is reduced as small as possible, so that the first lens L1 that is relatively sensitive to a tolerance is provided in a form in which the first lens L1 is not sensitive to tolerance. The refractive power P1 of the first lens L1 satisfies $-0.01$ mm$^{-1}$<P1<0.01 mm$^{-1}$.

Furthermore, the form of the lens that is not sensitive to a tolerance is designed such that a lens thickness et1 at a height of a front effective diameter and a center thickness ct1 of the first lens satisfy |et1−ct1|<0.07 mm.

The second lens L2 is shaped with the opposite convex surfaces and the refractive power P2 of the second lens L2 satisfies P2>0.4 mm$^{-1}$.

The above configuration is provided to form the second lens L2, which is the most sensitive to a tolerance, with the opposite convex surfaces (object-side surface and image-side surface) so as to minimize the sensitivity to a tolerance of the second lens L2.

The third lens L3 has negative refractive power and the rear surface curvature C6 of the third lens L3 satisfies $-0.01$ mm$^{-1}$<C6<0.01 mm$^{-1}$ so that the shape of the third lens L3 is appropriate for the implementation of the small lens system.

The refractive power P4 of the fourth lens L4 satisfies $-0.1$ mm$^{-1}$<P4<0.1 mm$^{-1}$ so as to have week refractive power, thereby reducing the sensitivity and implementing the small lens system.

Furthermore, a lens thickness et4 at a height of a front effective diameter and a center thickness ct4 of the fourth lens L4 satisfy |et4−ct4|<0.05 mm, thereby reducing the sensitivity and being appropriate for the implementation of the small lens system.

Furthermore, for the implementation of the small lens system, the refractive power P5 of the fifth lens L5 satisfies P5>0.7 mm$^{-1}$.

Furthermore, an absolute value |P5| of the refractive power of the fifth lens L5 and an absolute value P6 of the refractive power of the sixth lens L6 are provided similar to each other, so that the implementation of the small lens system is possible. Herein, the absolute value |P5| of the refractive power of the fifth lens L5 and the absolute value P6 of the refractive power of the sixth lens L6 satisfy $-0.1$ mm$^{-1}$<|P5|−|P6|<0.1 mm$^{-1}$.

Furthermore, a lens thickness et5 at a height of a front effective diameter and a center thickness ct5 of the fifth lens L5 satisfy |et5−ct5|>0.15 mm, thereby relieving the sensitivity and implementing the small lens system.

The refractive power P6 of the sixth lens L6 satisfies P6<$-0.7$ mm$^{-1}$, the object-side surface of the sixth lens L6 has at least one inflection point, the sag amount is increased and reduced in response to the height of the lens, the image-side surface of the sixth lens L6 has at least one inflection point, and the sag amount is increased and reduced in response to the height of the lens, so that the present disclosure is designed such that a distance between lenses is reduced and the sensitivity to tolerance is minimized.

Furthermore, the small lens system according to the present disclosure is configured such that an Abbe number V1 of the first lens L1, an Abbe number V2 of the second lens L2, an Abbe number V3 of the third lens L3, an Abbe number V4 of the fourth lens L4, an Abbe number V5 of the fifth lens L5, and an Abbe number V6 of the sixth lens L6 satisfy 50<V1<60, 50<V2<60, 15<V3<30, 15<V4<30, 50<V5<60, and 50<V6<60, respectively.

As described above, as a material with a high Abbe number and a material with a low Abbe number are alternately used, the above configuration is suitable for the high resolution small lens by correction of chromatic aberration of the lens and complement of the performance.

Furthermore, the first lens to the sixth lens L1 to L6 are made of plastic materials, and are formed in aspherical surfaces, thereby correcting spherical aberration and chromatic aberration. Each lens is made of a material that has an advantageous refractive index for reducing the distance, and a material in which the Abbe number is properly distributed to favor correction.

As described above, the present disclosure relates to a small lens system consisting of six lenses, and the small lens system is configured such that the first lens L1, the second lens L2, the third lens L3, the fourth lens L4, the fifth lens L5, and the sixth lens L6 are arranged along the optical axis from the object.

The present disclosure relates to the small lens system in which the first lens L1, the second lens L2, the third lens L3, the fourth lens L4, the fifth lens L5, and the sixth lens L6 are arranged along the optical axis from the object. The small lens system is properly designed in the refractive power, shape, etc. thereof, so that there is an effect of providing the small lens system that is small and lightweight and is less sensitive to tolerance.

Specifically, the tolerance sensitivity is relieved by presetting the refractive power of each lens, locating the stop at the first lens L1 and reducing the refractive power as small as possible, and forming the second lens L2 with opposite convex surfaces and giving the strong positive refractive power to the second lens.

Furthermore, the small lens system is provided such that the fifth lens L5 has the strong positive refractive power to reduce the length of the lens, the absolute value of the refractive power of the fifth lens L5 and the absolute value of the refractive power of the sixth lens L6 are similar to each other, a distance between the lenses is reduced while the sag amount of the sixth lens L6 is increased and reduced in response to the height thereof.

Hereinbelow, embodiments of the present disclosure will be described in detail with reference to the accompanying drawings.

First Embodiment

FIG. 3 is a view showing a small lens system for developing relieved sensitivity according to a first embodiment of the present disclosure.

As shown in FIG. 3, the first lens L1, the second lens L2, the third lens L3, the fourth lens L4, the fifth lens L5, and the sixth lens L6 are arranged in order along the optical axis from the object.

Next, Table 1 presents numeric data of the lens constituting the small lens system according to the first embodiment of the present disclosure.

TABLE 1

| Surface (No.) | RDY (Radius of curvature) | THI (Thickness) | Nd (Refractive index) | Vd (Abbe number) |
|---|---|---|---|---|
| OBJECT | INFINITY | INFINITY | | |
| 1 | 2.783 | 0.29 | 1.535 | 56.0 |
| STOP | 2.683 | 0.20 | | |
| 3 | 1.657 | 0.50 | 1.544 | 56.0 |
| 4 | −2.329 | 0.10 | | |
| 5 | −1.952 | 0.14 | 1.651 | 21.5 |

$$X(Y) = \frac{Y^2}{R} \frac{1}{1+\sqrt{1-(1+2)\frac{Y^2}{F}}} +$$ [Equation 1]

$$ar_4 Y^4 + ar_6 Y^6 + ar_8 Y^8 + \ldots + ar_{30} Y^{30}$$

X(Y): sag amount
R: radius
k: conic constant
Y: radial distance
$ar_n$: coefficient of $Y^n$.

An aspherical coefficient having the data of each lens from Equation 1 is as shown in Table 2.

TABLE 2

| | k | ar4 | ar6 | ar8 | ar10 | ar12 | ar14 | ar16 |
|---|---|---|---|---|---|---|---|---|
| s1 | −7.64101 | −0.109148 | −0.901968 | 9.03942 | −54.7951 | 201.327 | −455.321 | 619.21 |
| s2 | 10.0246 | −0.566084 | 1.97546 | −22.9786 | 152.828 | −621.257 | 1575.28 | −2426.6 |
| s3 | −2.68723 | −0.0920687 | −1.56075 | 13.7074 | −86.8231 | 339.026 | −825.676 | 1232.53 |
| s4 | −4.61443 | 0.319505 | −4.37918 | 39.7811 | −278.339 | 1376.62 | −4834.32 | 1.23E+04 |
| s5 | 0 | 2.2469 | −20.5692 | 8.45584 | 2071.37 | −30800.4 | 2.57E+05 | −1.42E+06 |
| s6 | −71.6111 | 1.85105 | −13.5545 | 9.88917 | 710.093 | −8098.09 | 51719.1 | −222012 |
| s7 | −89.3713 | 0.129882 | −4.23606 | 27.9168 | −165.623 | 940.091 | −5000.28 | 22442.8 |
| s8 | 0 | −0.472534 | 0.938554 | −20.574 | 200.993 | −1267.76 | 5584.3 | −17768.6 |
| s9 | −97.9147 | −2.47901 | 26.3994 | −232.821 | 1462.07 | −6577.75 | 21248.6 | −49369.7 |
| S10 | −5.27682 | −2.02566 | 18.8898 | −132.035 | 643.226 | −2203.34 | 5389.07 | −9510.39 |
| S11 | −80.012 | 1.39859 | −7.9315 | 28.5564 | −74.3067 | 141.652 | −199.505 | 208.57 |
| S12 | −5.51255 | 0.246196 | −1.44142 | 3.98357 | −7.50833 | 10.0665 | −9.78348 | 6.96189 |

| | ar18 | ar20 | ar22 | ar24 | ar26 | ar28 | ar30 |
|---|---|---|---|---|---|---|---|
| s1 | −463.532 | 146.733 | 0 | 0 | 0 | 0 | 0 |
| s2 | 2075.57 | −756.204 | 0 | 0 | 0 | 0 | 0 |
| s3 | −1034.66 | 373.969 | 0 | 0 | 0 | 0 | 0 |
| s4 | −2.27E+04 | 3.07E+04 | −3.00E+04 | 2.06E+04 | −9.42E+03 | 2.58E+03 | −318.797 |
| s5 | 5.50E+06 | −1.51E+07 | 2.93E+07 | −3.94E+07 | 3.49E+07 | −1.84E+07 | 4.34E+06 |
| s6 | 6.73E+05 | −1.46E+06 | 2.26E+06 | −2.43E+06 | 1.74E+06 | −738723 | 141791 |
| s7 | −77587.8 | 196408 | −352945 | 435501 | −349472 | 163781 | −33941.9 |
| s8 | 41595.4 | −71664.1 | 89311.1 | −77750.1 | 44547.3 | −15018.2 | 2249.49 |
| s9 | 82702.4 | −99744.8 | 85732.8 | −51215 | 20201 | −4727.91 | 496.875 |
| S10 | 12167.9 | −11256.1 | 7431.67 | −3405.26 | 1026.28 | −182.532 | 14.4877 |
| S11 | −161.773 | 92.4149 | −38.2431 | 11.1172 | −2.14739 | 0.246947 | −0.0127717 |
| S12 | −3.63751 | 1.38855 | −0.381555 | 0.0732923 | −0.00931953 | 0.000703475 | −0.000024 |

TABLE 1-continued

| Surface (No.) | RDY (Radius of curvature) | THI (Thickness) | Nd (Refractive index) | Vd (Abbe number) |
|---|---|---|---|---|
| 6 | INFINITY | 0.17 | | |
| 7 | 6.611 | 0.23 | 1.615 | 25.9 |
| 8 | 4.177 | 0.15 | | |
| 9 | −1.693 | 0.60 | 1.535 | 56.0 |
| 10 | −0.458 | 0.10 | | |
| 11 | 9.000 | 0.27 | 1.535 | 56.0 |
| 12 | 0.536 | 0.40 | | |
| 13 | INFINITY | 0.15 | 1.517 | 64.2 |
| 14 | INFINITY | 0.72 | | |
| IMAGE | INFINITY | 0.00 | | |

As shown in FIG. 3, the first lens L1, the second lens L2, the third lens L3, the fourth lens L4, the fifth lens L5, and the sixth lens L6 are arranged in order from an object, and when a direction of the optical axis is preset as an X axis and a direction perpendicular to the optical axis is preset as an Y axis, an aspherical equation is as follows. The aspherical surface is a curved surface that is obtained by rotating a curved line obtained by the aspherical equation of Equation 1 around the optical axis.

Then, P1=0 mm$^{-1}$, P2=0.539 mm$^{-1}$, P4=−0.053 mm$^{-1}$, P5=1.0 mm$^{-1}$, and P6=−0.932 mm$^{-1}$ are satisfied, |P5|−|P6|=0.068 mm$^{-1}$ is satisfied (herein, P1 is the refractive power of the first lens L1, P2 is the refractive power of the second lens L2, P4 is the refractive power of the fourth lens L4, P5 is the refractive power of the fifth lens L5, and P6 is the refractive power of the sixth lens L6).

Then, C6=0 mm$^{-1}$ (herein, C6 is a rear surface curvature of the third lens L3) is satisfied, |et1−ct1|=0.035 mm, |et4−ct4|=0.007 mm, and |et5−ct5|=0.195 mm are satisfied (herein, et1 and ct1 respectively represent the lens thickness at the height of the front effective diameter and the center thickness of the first lens L1, et4 and ct4 respectively represent the lens thickness at the height of the front effective diameter and the center thickness of the fourth lens L4, and et5 and ct5 respectively represent the lens thickness at the height of the front effective diameter and the center thickness of the fifth lens L5).

FIG. 4 is a view showing the aberration degree according to the embodiment of the present disclosure.

In FIG. 4, first data represents spherical aberration. In the first data, a horizontal axis presents focus (mm), a vertical axis presents longitudinal spherical aberration (mm), and each graph presents wavelength of incident rays. As shown in the drawing, it is known that as graphs are closer to a central vertical axis and to each other, correctability of the spherical aberration is excellent. The spherical aberration in the first embodiment of the present disclosure is determined to be good at 0.025 mm (focus) or less.

In FIG. 4, second data presents astigmatism. In the second data, a horizontal axis presents focus (mm), a vertical axis presents longitudinal spherical aberration (mm), and a graph S presents sagittal (sag) rays incident in a horizontal direction with the lens and a graph T presents tangential that is rays incident in a perpendicular direction to the lens. Herein, it is known that as the graph S and the graph T are closer to each other and to a central vertical axis, correctability of the astigmatism is excellent. The astigmatism according to the first embodiment of the present disclosure is determined to be good at 0.025 mm (focus) or less.

In FIG. 4, third data presents distortion. In the third data, a horizontal axis presents distortion (%) and a vertical axis presents longitudinal spherical aberration (mm). Generally, it is known that an aberration curve is good within a range of −2 to 2%, and by the distortion according to the first embodiment of the present disclosure, optical distortion is determined to be good at 2% or less.

Second Embodiment

FIG. 5 is a view showing a small lens system for developing relieved sensitivity according to a second embodiment of the present disclosure.

TABLE 3

| Surface (No.) | RDY (Radius of curvature) | THI (Thickness) | Nd (Refractive index) | Vd (Abbe number) |
|---|---|---|---|---|
| OBJECT | INFINITY | INFINITY | | |
| 1 | 2.819 | 0.35 | 1.535 | 56.0 |
| STOP | 2.697 | 0.10 | | |
| 3 | 1.813 | 0.50 | 1.544 | 56.0 |
| 4 | −2.724 | 0.13 | | |
| 5 | −2.074 | 0.17 | 1.651 | 21.5 |
| 6 | INFINITY | 0.15 | | |
| 7 | 5.146 | 0.26 | 1.615 | 25.9 |
| 8 | 3.510 | 0.18 | | |
| 9 | −1.268 | 0.52 | 1.535 | 56.0 |
| 10 | −0.431 | 0.10 | | |
| 11 | 9.000 | 0.40 | 1.535 | 56.0 |
| 12 | 0.515 | 0.42 | | |
| 13 | INFINITY | 0.15 | 1.517 | 64.2 |
| 14 | INFINITY | 0.62 | | |
| IMAGE | INFINITY | 0.00 | | |

As shown in FIG. 5, the first lens L1, the second lens L2, the third lens L3, the fourth lens L4, the fifth lens L5, and the sixth lens L6 are arranged in order from an object, and when a direction of the optical axis is preset as an X axis and a direction perpendicular to the optical axis is preset as an Y axis, an aspherical equation is equivalent to Equation 1.

An aspherical coefficient having the data of each lens from Equation 1 is as shown in Table 4.

TABLE 4

| | k | ar4 | ar6 | ar8 | ar10 | ar12 | ar14 | ar16 |
|---|---|---|---|---|---|---|---|---|
| s1 | −1.76957 | −0.115653 | −0.329877 | 5.11697 | −47.9452 | 250.86 | −766.298 | 1357.84 |
| s2 | 10.0858 | −0.501731 | −0.45895 | 1.65453 | 6.0669 | −80.9207 | 360.128 | −821.028 |
| s3 | −3.78624 | −0.258013 | −0.12194 | −4.29623 | 38.6274 | −178.922 | 513.004 | −879.571 |
| s4 | −4.61443 | 0.16822 | −2.7686 | 30.3814 | −250.211 | 1408.23 | −5523.86 | 15455.3 |
| s5 | 0 | 1.39325 | −7.34757 | −78.4373 | 2107.84 | −25545.6 | 200046 | −1.091E+06 |
| s6 | −71.6111 | 1.26231 | −6.20477 | −1.21021 | 186.582 | −1228.17 | 3883.06 | −3128.06 |
| s7 | −89.3713 | 0.0834969 | −4.30733 | 29.5262 | −175.731 | 1002.74 | −5399.48 | 24560.5 |
| s8 | 0 | −0.65393 | 12.8338 | −194.131 | 1671.84 | −9509.15 | 37695.2 | −107092 |
| s9 | −97.9147 | −3.59203 | 53.317 | −493.216 | 3027.37 | −12927.7 | 39241.3 | −85960.6 |
| S10 | −5.81347 | −2.90969 | 27.5503 | −183.283 | 839.197 | −2701.12 | 6208.94 | −10317.9 |
| S11 | −80.012 | 1.41239 | −7.69685 | 25.244 | −58.9136 | 101.705 | −131.784 | 128.801 |
| S12 | −6.86853 | 0.538386 | −2.95848 | 8.3057 | −15.2994 | 19.7122 | −18.3068 | 12.4433 |

| | ar18 | ar20 | ar22 | ar24 | ar26 | ar28 | ar30 |
|---|---|---|---|---|---|---|---|
| s1 | −1291.88 | 510.349 | 0 | 0 | 0 | 0 | 0 |
| s2 | 951.283 | −443.478 | 0 | 0 | 0 | 0 | 0 |
| s3 | 818.19 | −316.784 | 0 | 0 | 0 | 0 | 0 |
| s4 | −31238.9 | 45691.4 | −47865.4 | 34983.9 | −16928.6 | 4870.75 | −630.503 |
| s5 | 4.20E+06 | −1.17E+07 | 2.32E+07 | −3.21E+07 | 2.96E+07 | −1.62E+07 | 4.02E+06 |
| s6 | −25172 | 119892 | −273997 | 378674 | −321506 | 154835 | −32442.3 |
| s7 | −85995.3 | 220360 | −400734 | 500357 | −406325 | 192743 | −40441.9 |
| s8 | 220967 | −331485 | 357420 | −269461 | 134619 | −39983.7 | 5338.45 |
| s9 | 137163 | −159548 | 133854 | −78847.2 | 30913.4 | −7234.51 | 763.453 |
| S10 | 12490.4 | −11012.1 | 6989.91 | −3106.84 | 915.771 | −160.411 | 12.6086 |
| S11 | −94.7939 | 52.0639 | −20.9478 | 5.97585 | −1.14124 | 0.130522 | −0.00674413 |
| S12 | −6.22377 | 2.28222 | −0.604859 | 0.112532 | −0.0139161 | 0.00102558 | −0.000034 |

As shown in FIG. 5, the first lens L1, the second lens L2, the third lens L3, the fourth lens L4, the fifth lens L5, and the sixth lens L6 are arranged in order along the optical axis from the object.

Next, Table 3 presents numeric data of the lenses constituting the optical system according to the second embodiment of the present disclosure.

Then, P1=0 mm$^{-1}$, P2=0.482 mm$^{-1}$, P4=−0.053 mm$^{-1}$, P5=1.0 mm$^{-1}$, and P6=−0.967 mm$^{-1}$ are satisfied, |P5|−P6|=0.033 mm$^{-1}$ is satisfied (herein, P1 is the refractive power of the first lens L1, P2 is the refractive power of the second lens L2, P4 is the refractive power of the fourth lens L4, P5 is the refractive power of the fifth lens L5, and P6 is the refractive power of the sixth lens L6).

Then, $C6=0$ mm$^{-1}$ (herein, C6 is a rear surface curvature of the third lens L3) is satisfied, |et1|−|ct1|=0.052 mm, et4−ct4|=0.011 mm, and |et5|−|ct5|=0.27 mm are satisfied (herein, et1 and ct1 respectively represent the lens thickness at the height of the front effective diameter and the center thickness of the first lens L1, et4 and ct4 respectively represent the lens thickness at the height of the front effective diameter and the center thickness of the fourth lens L4, and et5 and ct5 respectively represent the lens thickness at the height of the front effective diameter and the center thickness of the fifth lens L5).

FIG. 6 is a view showing the aberration degree according to the second embodiment of the present disclosure.

In FIG. 6, first data represents spherical aberration. In the first data, a horizontal axis presents focus (mm), a vertical axis presents longitudinal spherical aberration (mm), and each graph presents wavelength of incident rays. As shown in the drawing, it is known that as graphs are closer to a central vertical axis and to each other, correctability of the spherical aberration is excellent. The spherical aberration in the second embodiment of the present disclosure is determined to be good at 0.025 mm (focus) or less.

In FIG. 6, second data presents astigmatism. In the second data, a horizontal axis presents focus (mm), a vertical axis presents longitudinal spherical aberration (mm), and a graph S presents sagittal rays incident in a horizontal direction with the lens and a graph T presents tangential that is rays incident in a perpendicular direction to the lens. Herein, it is known that as the graph S and the graph T are closer to each other and to a central vertical axis, correctability of the astigmatism is excellent. The astigmatism according to the second embodiment of the present disclosure is determined to be good at 0.025 mm (focus) or less.

In FIG. 6, third data presents distortion. In the third data, a horizontal axis presents distortion (%) and a vertical axis presents longitudinal spherical aberration (mm). Generally, it is known that an aberration curve is good within a range of −2 to 2%, and by the distortion according to the second embodiment of the present disclosure, optical distortion is determined to be good at 2% or less.

Third Embodiment

FIG. 7 is a view showing a small lens system for developing relieved sensitivity according to a third embodiment of the present disclosure.

As shown in FIG. 7, the first lens L1, the second lens L2, the third lens L3, the fourth lens L4, the fifth lens L5, and the sixth lens L6 are arranged in order along the optical axis from the object.

Next, Table 5 presents numeric data of the lenses constituting the optical system according to the third embodiment of the present disclosure.

TABLE 5

| Surface (No.) | RDY (Radius of curvature) | THI (Thickness) | Nd (Refractive index) | Vd (Abbe number) |
| --- | --- | --- | --- | --- |
| OBJECT | INFINITY | INFINITY | | |
| 1 | 2.864 | 0.32 | 1.535 | 56.0 |
| STOP | 2.752 | 0.14 | | |
| 3 | 1.655 | 0.50 | 1.544 | 56.0 |
| 4 | −2.999 | 0.12 | | |
| 5 | −2.429 | 0.15 | 1.651 | 21.5 |
| 6 | INFINITY | 0.22 | | |
| 7 | 18.931 | 0.21 | 1.634 | 23.9 |
| 8 | 7.364 | 0.18 | | |
| 9 | −1.646 | 0.55 | 1.535 | 56.0 |
| 10 | −0.452 | 0.10 | | |
| 11 | INFINITY | 0.26 | 1.535 | 56.0 |
| 12 | 0.570 | 0.41 | | |
| 13 | INFINITY | 0.15 | 1.517 | 64.2 |
| 14 | INFINITY | 0.70 | | |
| IMAGE | INFINITY | 0.00 | | |

As shown in FIG. 7, the first lens L1, the second lens L2, the third lens L3, the fourth lens L4, and the fifth lens L5 are arranged in order from an object, and when a direction of the optical axis is preset as an X axis and a direction perpendicular to the optical axis is preset as an Y axis, an aspherical equation is equivalent to Equation 1.

An aspherical coefficient having the data of each lens from Equation 1 is as shown in Table 6.

TABLE 6

| | k | ar4 | ar6 | ar8 | ar10 | ar12 | ar14 | ar16 |
| --- | --- | --- | --- | --- | --- | --- | --- | --- |
| s1 | −5.61069 | −0.122754 | −0.544561 | 5.34271 | −33.0535 | 127.493 | −309.309 | 459.238 |
| s2 | 10.402 | −0.5577 | 0.75502 | −8.06525 | 55.349 | −229.75 | −603.626 | −978.456 |
| s3 | −1.90379 | −0.21904 | −0.648229 | 5.46441 | −35.5705 | 149.22 | −379.866 | 580.474 |
| s4 | −4.61443 | 0.0728761 | −0.699222 | 2.17183 | −5.94552 | 9.79514 | 0.452218 | −23.8318 |
| s5 | 0 | 1.01747 | −2.95105 | −123.975 | 2449.82 | −26552.2 | 194559 | −1.01E+06 |
| s6 | −71.6111 | 1.06339 | −6.18103 | −0.740443 | 331.156 | −3422.73 | 20966.8 | −88434.5 |
| s7 | −89.3713 | −0.0119319 | −1.88339 | 5.34053 | −8.76871 | 5.51934 | 0 | 0 |
| s8 | 0 | −0.416607 | 0.782849 | 2.47621 | −138.451 | 1396.31 | −7902.03 | 29388.2 |
| s9 | −97.9147 | −3.02787 | 31.4121 | −270.41 | 1725.85 | −8088.52 | 27715 | −69259.3 |
| S10 | −4.84044 | −1.8849 | 15.8226 | −104.154 | 484.902 | −1611.02 | 3868.39 | −6765.95 |
| S11 | −80.012 | 1.541 | −7.47029 | 23.4763 | −54.6919 | 95.6226 | −125.809 | 124.533 |
| S12 | −6.72808 | 0.634116 | −3.42153 | 9.73701 | −18.4012 | 24.3569 | −23.1873 | 16.1075 |

| | ar18 | ar20 | ar22 | ar24 | ar26 | ar28 | ar30 |
| --- | --- | --- | --- | --- | --- | --- | --- |
| s1 | −379.869 | 133.822 | 0 | 0 | 0 | 0 | 0 |
| s2 | 891.17 | −348.935 | 0 | 0 | 0 | 0 | 0 |
| s3 | −491.911 | 177.758 | 0 | 0 | 0 | 0 | 0 |
| s4 | −25.1652 | 262.964 | −593.493 | 701.425 | −477.31 | 177.61 | −28.119 |
| s5 | 3.84E+06 | −1.06E+07 | 2.09E+07 | −2.91E+07 | 2.69E+07 | −1.48E+07 | 3.69E+06 |
| s6 | 267320 | −584978 | 919890 | −1.01E+06 | 742499 | −324753 | 64143.9 |
| s7 | 0 | 0 | 0 | 0 | 0 | 0 | 0 |

TABLE 6-continued

| s8 | −75596.2 | 136604 | −172640 | 149114 | −83716 | 27485.6 | −3999.26 |
| s9 | 125940 | −165555 | 155019 | −100473 | 42723.8 | −10700 | 1194.3 |
| S10 | 8645.31 | −8034.48 | 5351.57 | −2480.27 | 757.064 | −136.418 | 10.9666 |
| S11 | −92.3865 | 50.8865 | −20.4398 | 5.80064 | −1.09927 | 0.124552 | −0.00636908 |
| S12 | −8.2108 | 3.06145 | −0.823568 | 0.155335 | −0.0194589 | 0.00145209 | −0.000049 |

Then, P1=0 mm$^{-1}$, P2=0.492 mm$^{-1}$, P4=−0.053 mm$^{-1}$, P5=1.0 mm$^{-1}$, and P6=−0.941 mm$^{-1}$ are satisfied, |P5|−|P6|=0.059 mm$^{-1}$ is satisfied (herein, P1 is the refractive power of the first lens L1, P2 is the refractive power of the second lens L2, P4 is the refractive power of the fourth lens L4, P5 is the refractive power of the fifth lens L5, and P6 is the refractive power of the sixth lens L6).

Then, C6=0 mm$^{-1}$ (herein, C6 is a rear surface curvature of the third lens L3) is satisfied, |et1−ct1|=0.039 mm, |et4−ct4|=0.032 mm, and |et5−ct5|=0.22 mm are satisfied (herein, et1 and ct1 respectively represent the lens thickness at the height of the front effective diameter and the center thickness of the first lens L1, et4 and ct4 respectively represent the lens thickness at the height of the front effective diameter and the center thickness of the fourth lens L4, and et5 and ct5 respectively represent the lens thickness at the height of the front effective diameter and the center thickness of the fifth lens L5).

FIG. 8 is a view showing the aberration degree according to the third embodiment of the present disclosure.

In FIG. 8, first data represents spherical aberration. In the first data, a horizontal axis presents focus (mm), a vertical axis presents longitudinal spherical aberration (mm), and each graph presents wavelength of incident rays. As shown in the drawing, it is known that as graphs are closer to a central vertical axis and to each other, correctability of the spherical aberration is excellent. The spherical aberration in the third embodiment of the present disclosure is determined to be good at 0.025 mm (focus) or less.

In FIG. 8, second data presents astigmatism. In the second data, a horizontal axis presents focus (mm), a vertical axis presents longitudinal spherical aberration (mm), and a graph S presents sagittal rays incident in a horizontal direction with the lens and a graph T presents tangential that is rays incident in a perpendicular direction to the lens. Herein, it is known that as the graph S and the graph T are closer to each other and to a central vertical axis, correctability of the astigmatism is excellent. The astigmatism according to the third embodiment of the present disclosure is determined to be good at 0.025 mm (focus) or less.

In FIG. 8, third data presents distortion. In the third data, a horizontal axis presents distortion (%) and a vertical axis presents longitudinal spherical aberration (mm). Generally, it is known that an aberration curve is good within a range of −2 to 2%, and by the distortion according to the third embodiment of the present disclosure, optical distortion is determined to be good at 2% or less.

Fourth Embodiment

FIG. 9 is a view showing a small lens system for developing a close tolerance according to a fourth embodiment of the present disclosure;

As shown in FIG. 9, the first lens L1, the second lens L2, the third lens L3, the fourth lens L4, the fifth lens L5, and the sixth lens L6 are arranged in order along the optical axis from the object.

Next, Table 7 presents numeric data of the lenses constituting the optical system according to the fourth embodiment of the present disclosure.

TABLE 7

| Surface (No.) | RDY (Radius of curvature) | THI (Thickness) | Nd (Refractive index) | Vd (Abbe number) |
| --- | --- | --- | --- | --- |
| OBJECT | INFINITY | INFINITY | | |
| 1 | 2.897 | 0.41 | 1.535 | 56.0 |
| STOP | 2.752 | 0.07 | | |
| 3 | 1.647 | 0.50 | 1.544 | 56.0 |
| 4 | −2.312 | 0.05 | | |
| 5 | −2.019 | 0.18 | 1.661 | 20.4 |
| 6 | INFINITY | 0.22 | | |
| 7 | 16.793 | 0.24 | 1.634 | 23.9 |
| 8 | 7.454 | 0.17 | | |
| 9 | −1.444 | 0.54 | 1.535 | 56.0 |
| 10 | −0.443 | 0.10 | | |
| 11 | INFINITY | 0.33 | 1.535 | 56.0 |
| 12 | 0.551 | 0.39 | | |
| 13 | INFINITY | 0.15 | 1.517 | 64.2 |
| 14 | INFINITY | 0.68 | | |
| IMAGE | INFINITY | 0.00 | | |

As shown in FIG. 9, the first lens L1, the second lens L2, the third lens L3, the fourth lens L4, and the fifth lens L5 are arranged in order from an object, and when a direction of the optical axis is preset as an X axis and a direction perpendicular to the optical axis is preset as an Y axis, an aspherical equation is equivalent to Equation 1.

An aspherical coefficient having the data of each lens from Equation 1 is as shown in Table 8.

TABLE 8

| | k | ar4 | ar6 | ar8 | ar10 | ar12 | ar14 | ar16 |
| --- | --- | --- | --- | --- | --- | --- | --- | --- |
| s1 | 2.0036 | −0.0785827 | −0.834106 | 8.94868 | −57.1423 | 226.212 | −561.233 | 845.352 |
| s2 | 10.5136 | −0.748897 | 0.737011 | −0.712169 | 3.61561 | −34.3459 | 174.277 | −454.494 |
| s3 | −3.09864 | −0.499178 | −0.00195649 | 4.01176 | −28.1111 | 118.971 | −292.299 | 405.011 |
| s4 | −4.61443 | 0.651329 | −7.85967 | 23.1787 | 261.537 | −5440.08 | 50736.9 | −290148 |
| s5 | 0 | 1.42026 | −10.241 | −22.4682 | 1333.91 | −17313.8 | 135621 | −715313 |
| s6 | −71.6111 | 0.878512 | −6.80452 | 37.0674 | −179.357 | 714.274 | −1886.92 | 1230.83 |
| s7 | −89.3713 | −0.089482 | −1.93551 | 5.99723 | −10.164 | 6.50701 | 0 | 0 |
| s8 | 0 | −0.611068 | 9.40644 | −119.883 | 899.188 | −4549.88 | 16150.4 | −40865.2 |
| s9 | −97.9147 | −3.45588 | 46.3035 | −426.567 | 2718.43 | −12344.7 | 40417.5 | −96130.6 |
| S10 | −5.50428 | −2.34205 | 21.0261 | −134.629 | 597.33 | −1885.06 | 4301.69 | −7166.91 |

TABLE 8-continued

| | | | | | | | |
|---|---|---|---|---|---|---|---|
| S11 | −80.012 | 1.61606 | −8.32726 | 26.2169 | −60.0221 | 102.744 | −132.24 | 127.884 |
| S12 | −6.65677 | 0.564291 | −2.96567 | 8.07775 | −14.7714 | 19.1314 | −17.9684 | 12.3815 |

| | ar18 | ar20 | ar22 | ar24 | ar26 | ar28 | ar30 |
|---|---|---|---|---|---|---|---|
| s1 | −703.246 | 246.915 | 0 | 0 | 0 | 0 | 0 |
| s2 | 590.535 | −303.193 | 0 | 0 | 0 | 0 | 0 |
| s3 | −285.098 | 75.0843 | 0 | 0 | 0 | 0 | 0 |
| s4 | 1.09E+06 | −2.74E+06 | 4.58E+06 | −4.88E+06 | 3.00E+06 | −803039 | −6499.42 |
| s5 | 2.63E+06 | −6.83E+06 | 1.25E+07 | −1.56E+07 | 1.28E+07 | −6.19E+06 | 1.33E+06 |
| s6 | 12825.8 | −59749.7 | 138000 | −194506 | 169334 | −84080.3 | 18292.8 |
| s7 | 0 | 0 | 0 | 0 | 0 | 0 | 0 |
| s8 | 74097.8 | −95836.7 | 86976.7 | −53595.2 | 21105.3 | −4716.33 | 444.603 |
| s9 | 166714 | −210124 | 189883 | −1195 57 | 49682.2 | −12220.9 | 1345.21 |
| S10 | 8758.16 | −7827.89 | 5047.88 | −2280.72 | 683.062 | −121.442 | 9.67565 |
| S11 | −92.5244 | 49.6207 | −19.3865 | 5.3501 | −0.986535 | 0.108907 | −0.00543623 |
| S12 | −6.28184 | 2.33619 | −0.627705 | 0.11836 | −0.0148328 | 0.00110784 | −0.000037 |

Then, $P1=0$ mm$^{-1}$, $P2=0.542$ mm$^{-1}$, $P4=-0.047$ mm$^{-1}$, $P5=1.0$ mm$^{-1}$, and $P6=-0.975$ mm$^{-1}$ are satisfied, $|P5|-|P6|=0.025$ mm$^{-1}$ is satisfied (herein, P1 is the refractive power of the first lens L1, P2 is the refractive power of the second lens L2, P4 is the refractive power of the fourth lens L4, P5 is the refractive power of the fifth lens L5, and P6 is the refractive power of the sixth lens L6).

Then, $C6=0$ mm$^{-1}$ (herein, C6 is a rear surface curvature of the third lens L3) is satisfied, $|et1-ct1|=0.059$ mm, $|et4-ct4|=0.037$ mm, and $|et5-ct5|=0.222$ mm are satisfied (herein, et1 and ct1 respectively represent the lens thickness at the height of the front effective diameter and the center thickness of the first lens L1, et4 and ct4 respectively represent the lens thickness at the height of the front effective diameter and the center thickness of the fourth lens L4, and et5 and ct5 respectively represent the lens thickness at the height of the front effective diameter and the center thickness of the fifth lens L5).

FIG. 10 is a view showing the aberration degree according to the fourth embodiment of the present disclosure.

In FIG. 10, first data represents spherical aberration. In the first data, a horizontal axis presents focus (mm), a vertical axis presents longitudinal spherical aberration (mm), and each graph presents wavelength of incident rays. As shown in the drawing, it is known that as graphs are closer to a central vertical axis and to each other, correctability of the spherical aberration is excellent. The spherical aberration in the fourth embodiment of the present disclosure is determined to be good at 0.025 mm (focus) or less.

In FIG. 10, second data presents astigmatism. In the second data, a horizontal axis presents focus (mm), a vertical axis presents longitudinal spherical aberration (mm), and a graph S presents sagittal rays incident in a horizontal direction with the lens and a graph T presents tangential that is rays incident in a perpendicular direction to the lens. Herein, it is known that as the graph S and the graph T are closer to each other and to a central vertical axis, correctability of the astigmatism is excellent. The astigmatism according to the fourth embodiment of the present disclosure is determined to be good at 0.025 mm (focus) or less.

In FIG. 10, third data presents distortion. In the third data, a horizontal axis presents distortion (%) and a vertical axis presents longitudinal spherical aberration (mm). Generally, it is known that an aberration curve is good within a range of −2 to 2%, and by the distortion according to the third embodiment of the present disclosure, optical distortion is determined to be good at 2% or less.

Fifth Embodiment

FIG. 11 is a view showing a small lens system for developing a close tolerance according to a fifth embodiment of the present disclosure;

As shown in FIG. 11, the first lens L1, the second lens L2, the third lens L3, the fourth lens L4, the fifth lens L5, and the sixth lens L6 are arranged in order along the optical axis from the object.

Next, Table 9 presents numeric data of the lenses constituting the optical system according to the fifth embodiment of the present disclosure.

TABLE 9

| Surface (No.) | RDY (Radius of curvature) | THI (Thickness) | Nd (Refractive index) | Vd (Abbe number) |
|---|---|---|---|---|
| OBJECT | INFINITY | INFINITY | | |
| 1 | 2.805 | 0.43 | 1.535 | 56.0 |
| STOP | 2.655 | 0.07 | | |
| 3 | 1.877 | 0.50 | 1.544 | 56.0 |
| 4 | −1.964 | 0.05 | | |
| 5 | −2.024 | 0.18 | 1.651 | 21.5 |
| 6 | INFINITY | 0.18 | | |
| 7 | 5.631 | 0.26 | 1.634 | 23.9 |
| 8 | 3.778 | 0.18 | | |
| 9 | −1.428 | 0.55 | 1.535 | 56.0 |
| 10 | −0.443 | 0.10 | | |
| 11 | INFINITY | 0.35 | 1.535 | 56.0 |
| 12 | 0.546 | 0.40 | | |
| 13 | INFINITY | 0.15 | 1.517 | 64.2 |
| 14 | INFINITY | 0.65 | | |
| IMAGE | INFINITY | 0.00 | | |

As shown in FIG. 11, the first lens L1, the second lens L2, the third lens L3, the fourth lens L4, the fifth lens L5, and the sixth lens L6 are arranged in order from an object, and when a direction of the optical axis is preset as an X axis and a direction perpendicular to the optical axis is preset as an Y axis, an aspherical equation is equivalent to Equation 1.

An aspherical coefficient having the data of each lens from Equation 1 is as shown in Table 10.

TABLE 10

| | k | ar4 | ar6 | ar8 | ar10 | ar12 | ar14 | ar16 |
|---|---|---|---|---|---|---|---|---|
| s1 | 3.13791 | −0.0897852 | −0.544549 | 6.29622 | −42.4032 | 175.291 | −449.951 | 694.988 |
| s2 | 10.6902 | −0.777147 | 1.58433 | −16.276 | 137.094 | 699.57 | −2186.89 | −4085.44 |
| s3 | −7.14889 | −0.529444 | 0.250747 | −4.18398 | 39.7365 | −197.003 | 605.713 | −1130.43 |
| s4 | −4.61443 | 0.69438 | −8.64627 | −16.3785 | 1231.77 | −17058.6 | 142115 | −799558 |
| s5 | 0 | 1.67046 | −11.3257 | −62.0141 | 2199.33 | −26635.5 | 203041 | −1.07E+06 |
| s6 | −71.6111 | 1.11244 | −10.7713 | 99.574 | −973.518 | 8058.6 | −49899.1 | 224067 |
| s7 | −89.3713 | −0.136991 | −1.99844 | 7.18447 | −11.8625 | 7.12186 | 0 | 0 |
| s8 | 0 | −0.720193 | 10.4034 | −139.912 | 1117.99 | −6000.67 | 22650.1 | −61531.8 |
| s9 | −97.9147 | −3.33964 | 45.8318 | −420.032 | 2619.81 | −11512.1 | 36231.1 | −82564.6 |
| S10 | −5.37959 | −2.2032 | −20.5627 | −136.33 | −622.499 | −2003.82 | 4631.56 | −7776.62 |
| S11 | −80.012 | −1.73774 | −9.19331 | 29.4046 | −66.6299 | 110.694 | −137.214 | 128.13 |
| S12 | −6.72808 | 0.634116 | −3.42153 | 9.73701 | −18.4012 | 24.3569 | −23.1873 | 16.1075 |

| | ar18 | ar20 | ar22 | ar24 | ar26 | ar28 | ar30 |
|---|---|---|---|---|---|---|---|
| s1 | −588.365 | 208.928 | 0 | 0 | 0 | 0 | 0 |
| s2 | 4170.35 | −1779.88 | 0 | 0 | 0 | 0 | 0 |
| s3 | 1156 | −488.249 | 0 | 0 | 0 | 0 | 0 |
| s4 | 3.15E+06 | −8.78E+06 | 1.73E+07 | −2.35E+07 | 2.11E+07 | −1.12E+07 | 2.66E+06 |
| s5 | 4.04E+06 | −1.10E+07 | 2.15E+07 | −2.94E+07 | 2.68E+07 | −1.47E+07 | 3.64E+06 |
| s6 | −727646 | 1.71E+06 | −2.85E+06 | 3.32E+06 | −2.55E+06 | 1.16E+06 | −237859 |
| s7 | 0 | 0 | 0 | 0 | 0 | 0 | 0 |
| s8 | 121700 | −175392 | 182165 | −132750 | −64399.8 | −18681.1 | 2452.89 |
| s9 | 137107 | −165711 | 144016 | −87529.4 | 35248.2 | −8433.62 | 905.953 |
| S10 | 9542.07 | −8539.2 | 5501.28 | −2479.07 | 739.681 | −130.929 | 10.3828 |
| S11 | −90.3422 | 47.7964 | −18.6506 | 5.19516 | −0.974458 | 0.109944 | −0.00562016 |
| S12 | −8.2108 | 3.06145 | −0.823568 | 0.155335 | −0.0194589 | 0.00145209 | −0.000049 |

Then, P1=0 mm$^{-1}$, P2=0.543 mm$^{-1}$, P4=−0.053 mm$^{-1}$, P5=1.0 mm$^{-1}$, and P6=−0.983 mm$^{-1}$ are satisfied, |P5|−|P6|=0.017 mm$^{-1}$ is satisfied (herein, P1 is the refractive power of the first lens L1, P2 is the refractive power of the second lens L2, P4 is the refractive power of the fourth lens L4, P5 is the refractive power of the fifth lens L5, and P6 is the refractive power of the sixth lens L6).

Then, C6=0 mm$^{-1}$ (herein, C6 is a rear surface curvature of the third lens L3) is satisfied, |et1|−|ct1|=0.055 mm, |et4−ct4|=0.033 mm, and |et5|−|ct5|=0.233 mm are satisfied (herein, et1 and ct1 respectively represent the lens thickness at the height of the front effective diameter and the center thickness of the first lens L1, et4 and ct4 respectively represent the lens thickness at the height of the front effective diameter and the center thickness of the fourth lens L4, and et5 and ct5 respectively represent the lens thickness at the height of the front effective diameter and the center thickness of the fifth lens L5).

FIG. 12 is a view showing the aberration degree according to the fifth embodiment of the present disclosure.

In FIG. 12, first data represents spherical aberration. In the first data, a horizontal axis presents focus (mm), a vertical axis presents longitudinal spherical aberration (mm), and each graph presents wavelength of incident rays. As shown in the drawing, it is known that as graphs are closer to a central vertical axis and to each other, correctability of the spherical aberration is excellent. The spherical aberration in the fifth embodiment of the present disclosure is determined to be good at 0.025 mm (focus) or less.

In FIG. 12, second data presents astigmatism. In the second data, a horizontal axis presents focus (mm), a vertical axis presents longitudinal spherical aberration (mm), and a graph S presents sagittal rays incident in a horizontal direction with the lens and a graph T presents tangential that is rays incident in a perpendicular direction to the lens. Herein, it is known that as the graph S and the graph T are closer to each other and to a central vertical axis, correctability of the astigmatism is excellent. The astigmatism according to the fifth embodiment of the present disclosure is determined to be good at 0.025 mm (focus) or less.

In FIG. 12, third data presents distortion. In the third data, a horizontal axis presents distortion (%) and a vertical axis presents longitudinal spherical aberration (mm). Generally, it is known that an aberration curve is good within a range of −2 to 2%, and by the distortion according to the fifth embodiment of the present disclosure, optical distortion is determined to be good at 2% or less.

What is claimed is:

1. A small lens system for developing a close tolerance, the small lens system comprising a first lens, a second lens, a third lens, a fourth lens, a fifth lens, and a sixth lens that are arranged in order along an optical axis from an object,
    wherein refractive power P1 of the first lens satisfies −0.01 mm$^{-1}$<P1<0.01 mm$^{-1}$,
    the second lens is shaped with opposite convex surfaces, and refractive power P2 of the second lens satisfies P2>0.4 mm$^{-1}$,
    the third lens has negative refractive power, and a rear surface curvature C6 of the third lens satisfies −0.01 mm$^{-1}$<C6<0.01 mm$^{-1}$,
    refractive power P4 of the fourth lens satisfies −0.1 mm$^{-1}$<P4<0.1 mm$^{-1}$,
    refractive power P5 of the fifth lens satisfies P5>0.7 mm$^{-1}$, and
    refractive power P6 of the sixth lens satisfies P6<−0.7 mm$^{-1}$, an object-side surface of the sixth lens has at least one inflection point and amount of sagittal (sag) is increased and reduced in response to height of the sixth lens, and an image-side surface of the sixth lens has at least one inflection point and amount of sag is increased and reduced in response to the height thereof.

2. The small lens system of claim 1, wherein the small lens system has a stop located at the first lens.

3. The small lens system of claim 1, wherein an absolute value P5 of the refractive power of the fifth lens and an absolute value |P6| of the refractive power of the sixth lens satisfy −0.1 mm$^{-1}$<|P5|−|P6|<0.1 mm$^{-1}$.

4. The small lens system of claim 1, wherein a lens thickness et1 at a height of a front effective diameter and a center thickness ct1 of the first lens satisfy |et1−ct1|<0.07 mm.

5. The small lens system of claim 1, wherein a lens thickness et4 at a height of a front effective diameter and a center thickness ct4 of the fourth lens satisfy |et4−ct4|<0.05 mm.

6. The small lens system of claim 1, wherein a lens thickness et5 at a height of a front effective diameter and a center thickness ct5 of the fifth lens satisfy |et5−ct5|>0.15 mm.

7. The small lens system of claim 1, wherein an Abbe number V1 of the first lens, an Abbe number V2 of the second lens, an Abbe number V3 of the third lens, an Abbe number V4 of the fourth lens, an Abbe number V5 of the fifth lens, and an Abbe number V6 of the sixth lens satisfy 50<V1<60, 50<V2<60, 15<V3<30, 15<V4<30, 50<V5<60, and 50<V6<60, respectively.

8. The small lens system of claim 1, wherein each of the first lens to the sixth lens has only aspherical surfaces, and the first lens to the sixth lens are made of plastic.

\* \* \* \* \*